United States Patent
Uchiyama et al.

(10) Patent No.: US 6,400,369 B1
(45) Date of Patent: *Jun. 4, 2002

(54) INFORMATION PROCESSING METHOD AND APPARATUS FOR GENERATING TEXTURE-DATA FOR COMPUTER GRAPHICS

(75) Inventors: Shinji Uchiyama, Yokohama; Hiroyuki Yamamoto, Chigasaki; Toshikazu Ohshima, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/721,219

(22) Filed: Sep. 26, 1996

(30) Foreign Application Priority Data

Sep. 29, 1995 (JP) .............................. 7-252788
Sep. 29, 1995 (JP) .............................. 7-252790

(51) Int. Cl.$^7$ .............................................. G06T 13/00
(52) U.S. Cl. ...................................... 345/582; 345/581
(58) Field of Search .................................. 345/425, 430, 345/423, 581, 582, 585

(56) References Cited

U.S. PATENT DOCUMENTS

| 5,307,450 A | * | 4/1994 | Grossman ................... 345/423 |
| 5,333,245 A | | 7/1994 | Vecchione ................... 395/130 |
| 5,341,468 A | | 8/1994 | Shiraishi et al. ............ 395/132 |

FOREIGN PATENT DOCUMENTS

GB 2264847 9/1993

* cited by examiner

Primary Examiner—Mark Zimmerman
Assistant Examiner—Mano Padmanabhan
(74) Attorney, Agent, or Firm—Fitzpatrick, Cella, Harper & Scinto

(57) ABSTRACT

In order to simplify a photographing operation when providing a texture original image, and to remove a useless operation when extracting a necessary region from the texture original image, the necessary region is assigned in an original image, serving as a base for a texture, using characteristic points of a portion onto which the texture is to be mapped, and a quadrangle having a minimum area is extracted from among quadrangles enclosing the assigned region. An image enclosed by the extracted quadrangle is transformed into a rectangular image having a desired size, and the assigned region is transformed into a region in the rectangular image. The obtained rectangular image and data of the characteristic points for assigning the region are output as texture data. In order to automatically correlate the positions of points assigned in a polygon image with the positions of points assigned in the texture original image including a necessary texture image, respective vertices of the polygons of the displayed polygon image and corresponding points in the displayed texture original image are assigned. Thus, the texture image including the corresponding points is obtained, and position information of the corresponding points in the texture image is provided for the respective vertices assigned in the polygon image.

19 Claims, 14 Drawing Sheets

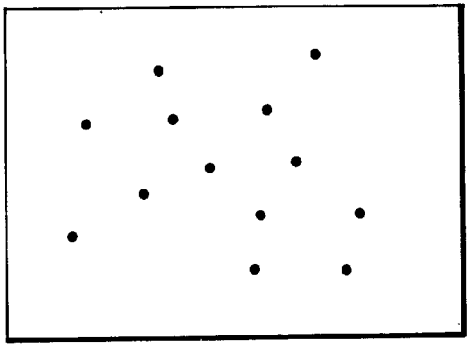
FIG.3(a) — VERTICES OR CONTROL POINTS ASSIGNED WITHIN TEXTURE ORIGINAL IMAGE
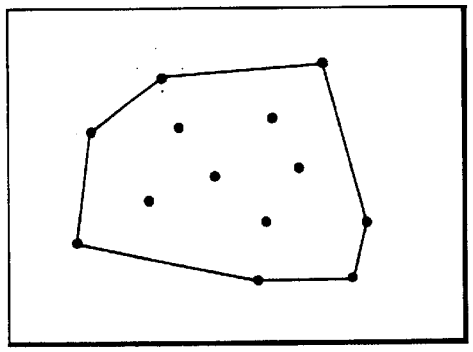
FIG.3(b) — OBTAIN FIGURE OF CONVEX HULL
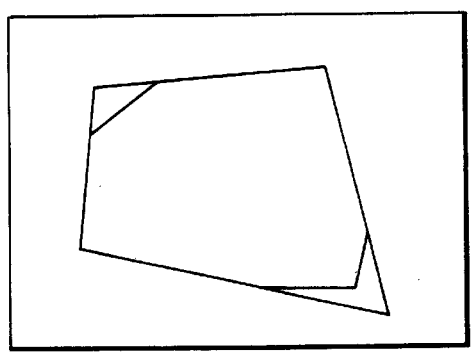
FIG.3(c) — SELECT FOUR EDGES FROM CONVEX HULL, AND GENERATE QUADRANGLE HAVING MINIMUM AREA

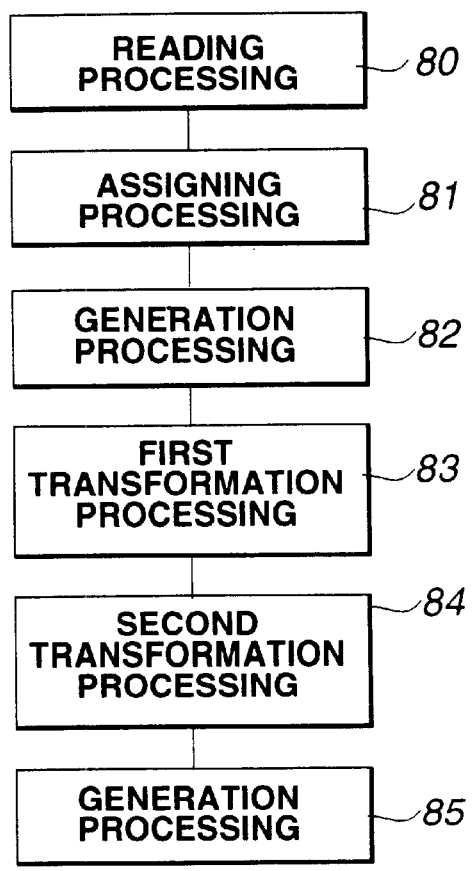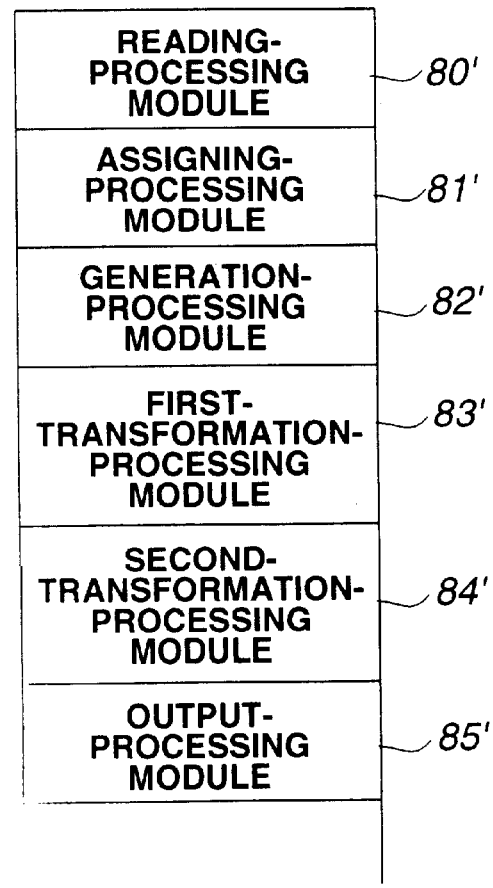

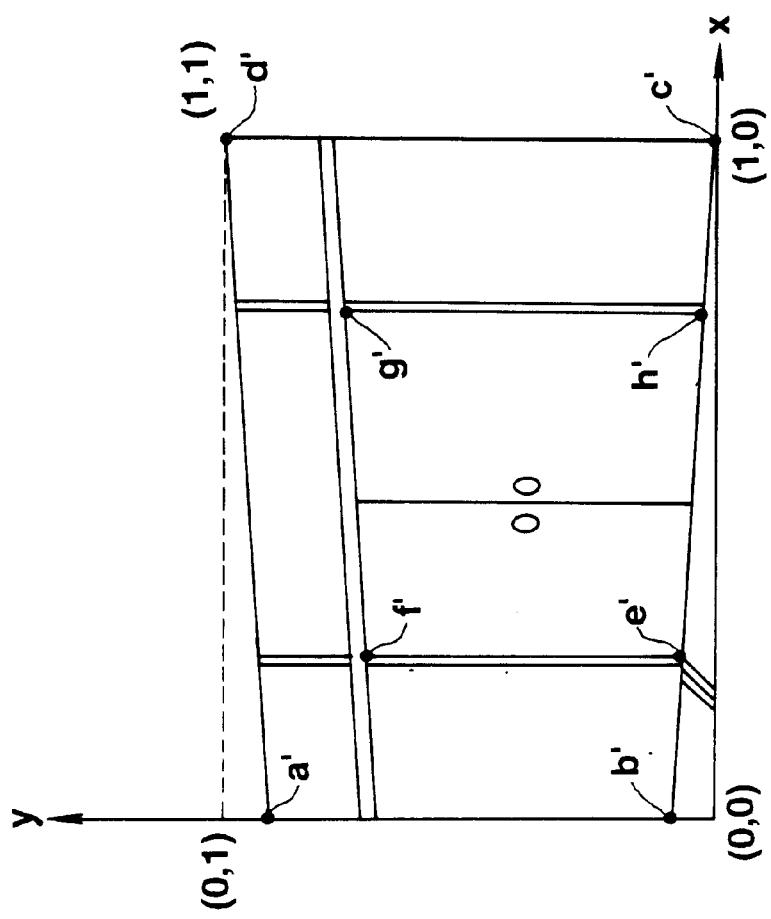
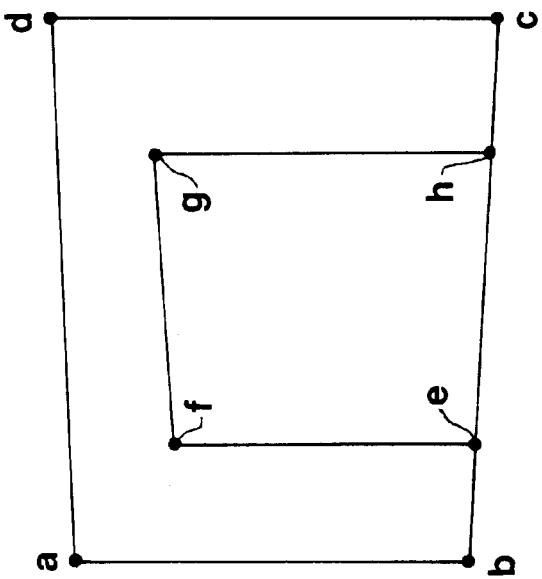
FIG.13(b)
FIG.13(a)

INFORMATION PROCESSING METHOD AND APPARATUS FOR GENERATING TEXTURE-DATA FOR COMPUTER GRAPHICS

BACKGROUND OF THE INVENTION

1. Field of the Invention

This invention relates to an information processing method and apparatus for drawing a three-dimensional scene using a computer graphics technique.

2. Description of the Related Art

In a method for drawing a three-dimensional scene in computer graphics, a surface pattern is prepared as texture data, which is mapped onto shape data of a three-dimensional scene. An image obtained by photographing a natural image can be used as the texture data.

Conventionally, when using a photographed natural image as texture data in the above-described manner, the texture data is generated according to the following two methods.

(1) An image is photographed by being adjusted to the shape and the size of an image to be used as texture data, to obtain a texture original image, and points (vertices or the like) corresponding to the shape of a portion where the image is to be mapped are set in the texture original image. Then, an image is mapped by making the points provided in the texture original image correspond to points in that portion.

(2) A desired regtangle is set in a texture original image obtained by photographing an image, and a necessary rectangular region is segmented from the texture original image. The segmented rectangular image is used as the texture original image and is mapped according to the same procedures (setting of vertices and pasting) as in the above-described method (1).

However, the above-described conventional methods for generating texture data have the following problems. First, in the method (1), an object to be utilized as a texture must be photographed by being adjusted to the shape and the size of an image to be used as texture data. That is, it is desirable to photograph the image so that the entire object to be utilized as the texture is included and that the image is obtained as large as possible. Hence, a photographing operation cannot be briefly performed. The object to be utilized as the texture must be photographed as large as possible in order to improve reproducibility of details of the texture after image pasting.

When, for example, photographing a flat surface as an object to be utilized as a texture, if the surface is photographed from an oblique direction, a part of the pattern or the like of the surface looks as being streched or distorted in the obtained image. In order to reproduce the details of the shrinked portion, high resolution is required, thereby increasing the amount of texture data. Accordingly, it is desirable to photograph the object from the direction which is perpendicular to the surface, thereby causing difficulty in the photographing operation.

In the method (2), since the necessary region within the texture original image is not always rectangular, there is the possibility that a large amount of unnecessary region remains. Furthermore, when photographing an object to be utilized as a texture from an oblique direction, the same problem as in the method (1) arises.

There is a method in which, when drawing a three-dimensional scene using computer graphics, the shape of a surface is represented using a polygon, and the pattern of the surface is drawn by mapping the texture image onto the polygon. The following method for acquiring a texture image to be used in such computer graphics is generally known.

A portion to be used as a texture image is assigned in the form of a rectangle from a texture original image, and the assigned portion is segmented to provide the texture image. Then, corresponding positions of the texture image are input for respective vertices of a polygon to which the texture image is to be mapped. Processing of mapping the texture image onto the polygon is executed based on information relating to the input positions.

In the above-described conventional method, however, since the texture image is segmented in the form of a rectangle, a large amount of time is required for providing the polygon, to which the texture image is to be mapped, with the positions of respective vertices when the polygon is not a quadrangle. For example, when pasting a part of a texture image segmented in the form of a rectangle shown in FIG. 13(b) to a polygon having vertices a–h shown in FIG. 13(a), the following procedure is necessary. That is, it is necessary to provide the respective vertices a–h (points indicated by black circles) with the normalized coordinate values of corresponding positions a'–h' (positions indicated by black circles) of the texture image within the rectangle. The normalized coordinates are coordinates in which the respective vertices of the rectangle are represented by (0,0), (1,0), (1,1) and (0,1).

As described above, in the above-described conventional method, since the user inputs the coordinate values of corresponding positions in the texture image for respective vertices on the polygon image, a very troublesome operation is required.

SUMMARY OF THE INVENTION

The present invention has been made in consideration of he above-described problems.

It is an object of the present invention to provide a texture-data generation method and apparatus in which a photographing operation when preparing a texture original image is simplified, and in which a useless operation when extracting a necessary region from the texture original image is removed (deletion of unnecessary regions).

It is another object of the present invention to provide an information processing method and apparatus in which the position of a point assigned in a polygon image can be automatically correlated with the position of a point assigned in a texture original image including a necessary texture image, and in which an operation of mapping the texture image onto a polygon is facilitated.

It is still another object of the present invention to provide an information processing method and apparatus in which computer graphics data having a texture can be interactively generated from an image appropriately including the region of a polygon without providing a texture image adjusted to the polygon in advance.

According to one aspect, the present invention which achieves these objectives relates to a texture-data generation apparatus for generating texture data to be used for computer graphics, comprising assigning means for assigning a region in a texture original image serving as a base for a texture, generation means for generating quadrangles, each enclosing the region assigned by the assigning means, based on a predetermined rule, extraction means for extracting a quadrangle having a minimum area from among the rectangles generated by the generation means, first transformation means for transforming an image enclosed by the quadrangle extracted by the extraction means into a rectangular image having a desired size, second transformation means for transforming the region assigned by the assigning means into a region in the rectangular image, and output means for outputting the rectangular image obtained by the first transformation means, and information indicating the region obtained by the second transformation means as texture data.

According to another aspect, the present invention which achieves these objectives relates to a texture-data generation method for generating texture data to be used for computer graphics, comprising the steps of assigning a region in a texture original image serving as a base for a texture, generating quadrangles, each enclosing the region assigned in the assigning step, based on a predetermined rule, extracting a quadrangle having a minimum area from among the quadrangles generated in the generating step, transforming an image enclosed by the quadrangle extracted in the extracting step into a rectangular image having a desired size, transforming the region assigned in the assigning step into a region in the rectangular image, and outputting the rectangular image obtained in the first transforming step, and information indicating the region obtained in the second transforming step as texture data.

According to still another aspect, the present invention which achieves these objectives relates to a storage medium for storing a program for controlling a computer, the program comprising a procedure code of an assigning step of assigning a region in a texture original image serving as a base for a texture, a procedure code of an generating step of generating quadrangles, each enclosing the region assigned in the assigning step, based on a predetermined rule, a procedure code of an extracting step of extracting a quadrangle having a minimum area from among the quadrangles generated in the generating step, a procedure code of a first transforming step of transforming an image enclosed by the quadrangle extracted in the extracting step into a rectangular image having a desired size, a procedure code of a second transformating step of transforming the region assigned in the assigning step into a region on the rectangular image, and a procedure code of an outputting step of outputting the rectangular image obtained in the first transforming step, and information indicating the region obtained in the second transforming step as texture data.

According to still another aspect, the present invention which achieves these objectives relates to an information processing apparatus comprising first display means for displaying a polygon image comprising at least one polygon, second display means for displaying a texture original image including a texture image to be used, assigning means for assigning points on the polygons of the polygon image displayed by the first display means, and corresponding points in the texture original image displayed by the second display means, provision means for providing the respective points assigned in the polygon image by the assigning means with position information of the corresponding points in the texture original image, and output means for outputting polygon data comprising the position information of the corresponding points in the texture original image provided for the points on the polygon by the provision means, and the texture original image as data for image drawing.

According to still another aspect, the present invention which achieves these objectives relates to an information processing method comprising the steps of displaying a polygon image comprising at least one polygon, displaying a texture original image including a texture image to be used, assigning points on the polygons of the polygon image displayed in the first displaying step, and corresponding points in the texture original image displayed in the second displaying step, providing the respective points assigned in the polygon image in the assigning step with position information of the corresponding points in the texture original image, and outputting polygon data comprising the position information of the corresponding points in the texture original image provided for the points on the polygons in the providing step, and the texture original image as data for image drawing.

According to still another aspect, the present invention which achieves these objectives relates to a storage medium for storing a program for controlling a computer, the program comprising a procedure code of a first displaying step of displaying a polygon image comprising at least one polygon, a procedure step of a second displaying step of displaying a texture original image including a texture image to be used, a procedure code of an assigning step of assigning points on the polygons of the polygon image displayed in the first displaying step, and corresponding points in the texture original image displayed in the second displaying step, a procedure code of a providing step of providing the respective points assigned in the polygon image in the assigning step with position information of the corresponding points in the texture original image, and a procedure code of an outputting step of outputting polygon data having the position information of the corresponding points in the texture original image provided for the points on the polygon in the providing step, and the texture original image as data for image drawing.

The foregoing and other objects, advantages and features of the present invention will become more apparent from the following detailed description of the preferred embodiments taken in conjunction with the accompanying drawings.

BRIEF DESCRIPTION OF THE DRAWINGS

FIGS. 3(a) through 3(c) are diagrams illustrating procedures of generation of a convex closure and a quadrangle S in a texture original image;

FIGS. 8(a) and 8(b) are diagrams illustrating the configuration of a storage medium storing a control program for realizing the control of the first embodiment;

FIGS. 13(a) and 13(b) are diagrams illustrating a typical method of obtaining a texture image.

DETAILED DESCRIPTION OF THE PREFERRED EMBODIMENTS

A description will now be provided of preferred embodiments of the present invention with reference to the drawings.

First Embodiment

Figure 1:
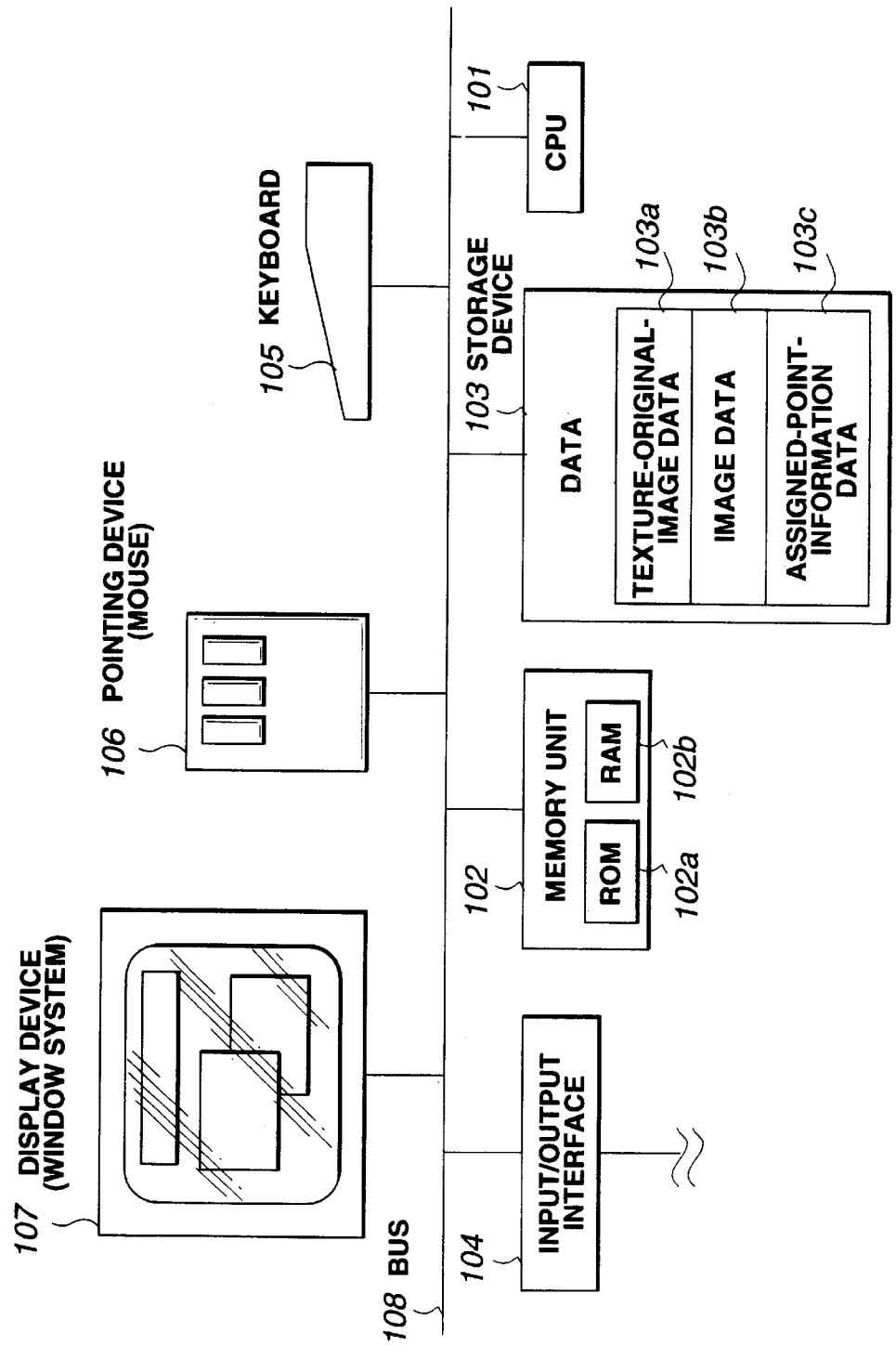
FIG. 1 is a schematic block diagram illustrating the configuration of a computer according to a first embodiment of the present invention.

FIG. 1 is a schematic block diagram illustrating the configuration of a computer according to a first embodiment of the present invention. In FIG. 1, a CPU (central processing unit) 101 executes various kinds of processing including the procedures of the first embodiment. A memory 102 includes a ROM (read-only memory) 102a and a RAM (random access memory) 102b. The ROM 102a stores control programs to be executed by the CPU 101 and various kinds of data. The RAM 102b provides operational areas for the CPU 101 to execute various kinds of controls.

A storage device 103 comprises, for example, hard disks, floppy disks or the like. The storage device 103 stores various kinds of data, such as texture-original-image data 103a, image data 103b, assigned-point-information data 103c, and the like.

Reference numeral 104 represents an input/output interface for inputting/outputting data to be processed from/to the outside of the apparatus. For example, a texture original image obtained by photographing an object is read by a scanner, and the read image can be input via the input/output interface 104. A keyboard 105 is used for selecting data or inputting procedures. A pointing device 106 is used for assigning a point on a display device, and comprises, for example, a mouse. A display device 107 displays the state, the result or the process of processing, and processed data. The display device 107 is controlled by a window system to realize multiwindow display.

Figure 2:
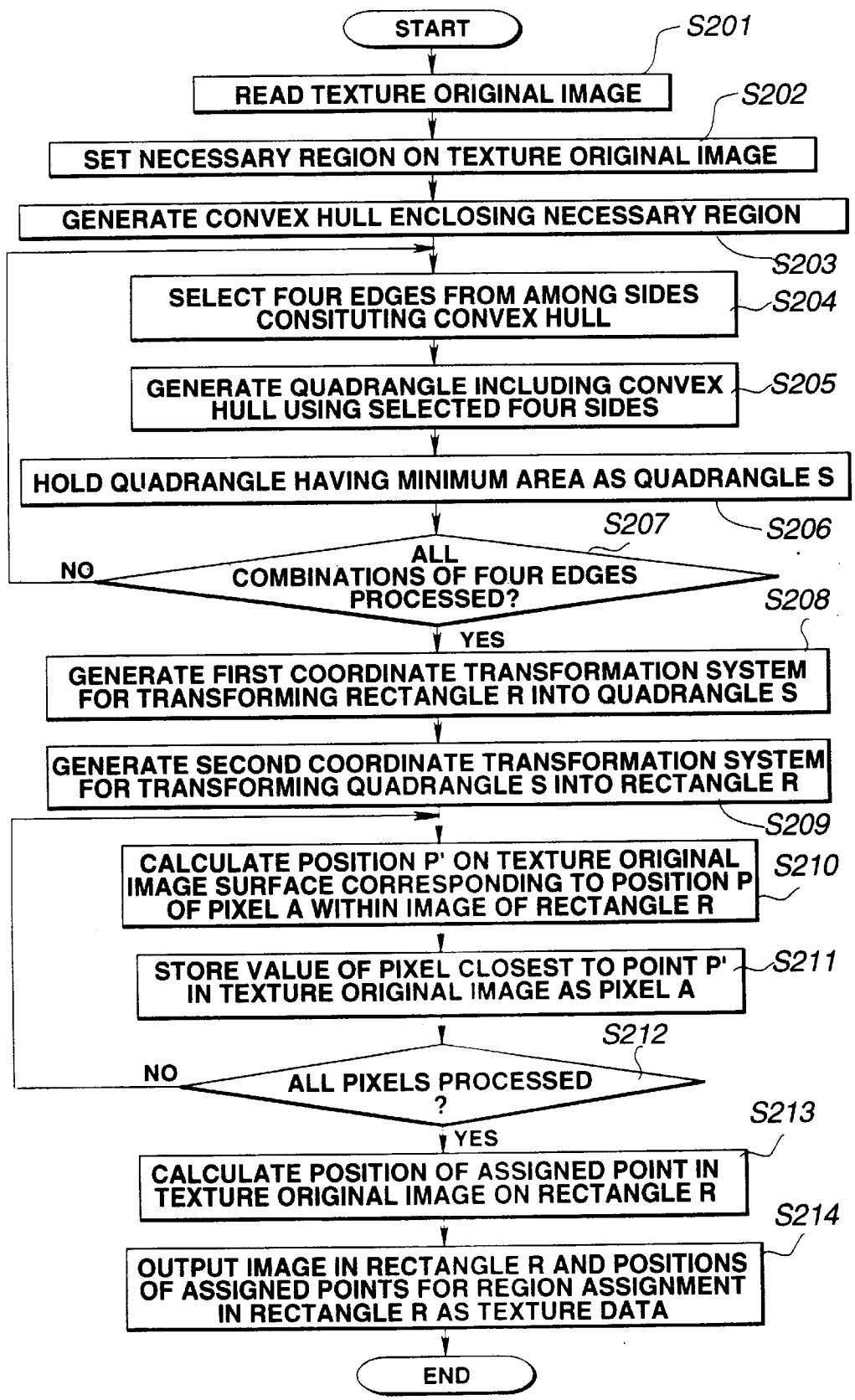
FIG. 2 is a flowchart illustrating procedures of texture-data generation processing in the first embodiment.

Next, a description will be provided of processing of generating texture data in the first embodiment which is realized in the computer having the above-described configuration. FIG. 2 is a flowchart illustrating procedures of texture-data generation processing in the first embodiment.

In step S201, a texture original image serving as a basse of a texture to be generated is read through the input/output interface 104, and is stored in the storage device 103 as texture-original-image data 103a. The texture original image is an ordinary color or black-and-white image including a texture to be generated. According to the following processing, an image serving as texture data is generated utilizing image data of a partial region of the texture original image.

In step S202, a region necessary as texture data is assigned in the texture original image. In this step, for example, a plurality of points in the texture original image corresponding to vertices or control points of patch data (a plane or a curved surface) to which the texture is to be mapped are assigned. After displaying the texture original image stored in the storage device 103 on the display device 107, these points are assigned using the mouse 106. Characteristic points, such as the assigned vertices or control points, are stored in the storage device 103 as the assigned-point-information data 103c.

Then, in step S203, a convex closure enclosing the region determined to be necessary for the texture data by the points in the texture original image assigned in step S202 is generated. For example, if the patch is a plane patch (polygon), a convex closure enclosing the assigned points, which are vertices, may be generated. In the case of a curved-surface patch, control points defining a curved surface to which a texture is to be mapped are assigned in the texture original image, and a convex hull enclosing the curved surface defined by the control points is generated. In this case, the control points are not always included within the convex hull. More specifically, the curved-surface patch defined by the control points is depicted on the plane of the texture original image, and a convex hull enclosing this depicted curved-surface patch is generated.

Then, in step S204, four edges are selected from among edges constituting the convex hull generated in step S203. Then, in step S205, quadrangles are generated using straight lines including the selected four edges. At that time, generated quadrangles which do not include the entire convex hull are removed, and only quadrangles including the entire convex hull are generated. When the area of a generated quandrangle is minimum of already generated quadrangles, this quadrangle is stored in the RAM 102b as a quadrangle S. In step S207, it is determined if the processing of steps S204–S206 has been completed for all combinations of four edges of the convex hull, in order to perform the processing for all the combinations. Thus, it is possible to generate a quadrangle S having a minimum area from among quadrangles including the convex hull. FIGS. 3(a)–3(c) illustrate the concept of the above-described processing.

FIGS. 3(a)–3(c) are diagrams illustrating procedures of generation of a convex hull and a quadrangle S in a texture original image. FIG. 3(a) illustrates vertices or control points assigned in the texture original image. Thus, a region necessary as texture data within the texture original image is set by the vertices or control points. FIG. 3(b) illustrates a state in which the figure of a convex hull is generated based on the points set within the texture original image. As shown in FIG. 3(b), the figure of the convex hull is a polygon obtained by connecting some of the set vertices or control points which includes all of the vertices or control points and which has a maximum area.

When the convex hull is obtained as shown in FIG. 3(b), a quadrangle formed by straight lines including four edges of the convex hull and having a minimum area is determined as a quadrangle S (see FIG. 3(c)).

Using the quadrangle S generated in the above-described manner, texture data is generated in step S208 and subsequent steps.

Figure 4:
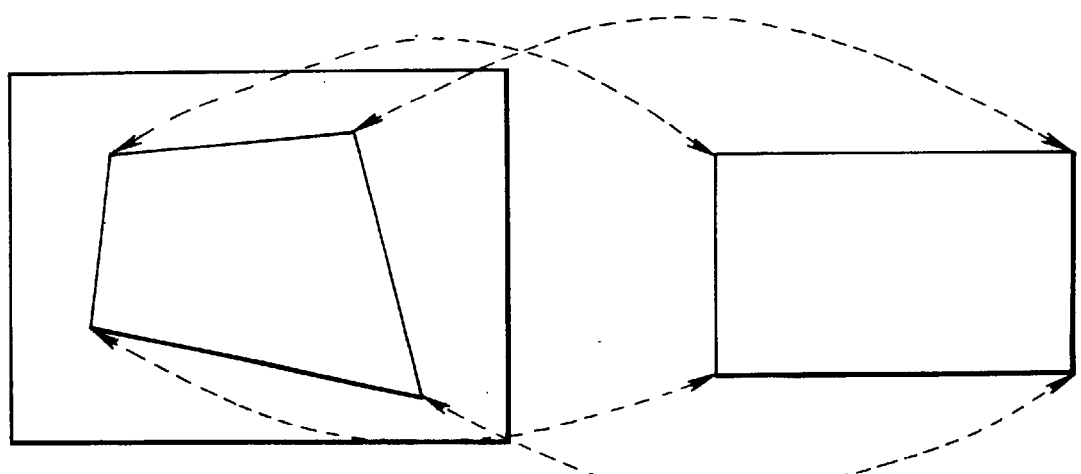
FIG. 4 is a diagram illustrating the correspondence between the quadrangle S and a rectangle R.
Figure 5:
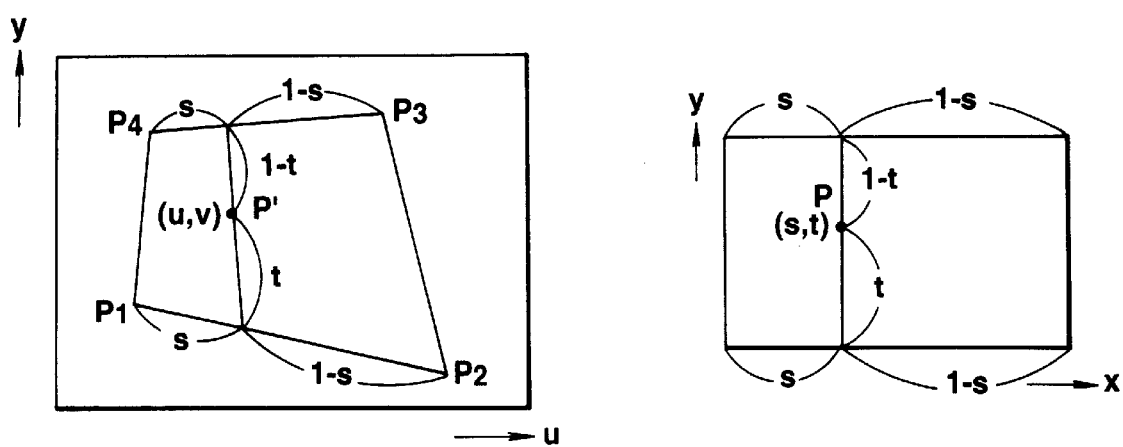
FIG. 5 is a diagram illustrating the correspondence between a point within the quadrangle S and a point within the rectangle R.

In step S208, an arbitrary rectangle R is supposed, and a first coordinate transformation system for transforming the rectangle R into the quadrangle S is generated. FIG. 4 illustrates the correspondence between the quadrangle S and the rectangle R. FIG. 5 illustrates the correspondence between a point within the quadrangle S and a point within the rectangle R. In the first coordinate transformation system, in order to make the vertices and the interior of the quadrangle S and the rectangle R correspond to each other as shown in FIG. 4, and, as shown in FIG. 5, to make a point (u,v) within the quadrangle S correspond to a point (s,t) within the rectangle R ($0 \leq s \leq 1$, $0 \leq t \leq 1$) as shown in FIG. 5, the following coordinate transformation is performed using bilinear interpolation:

$$u=(1-t)\cdot\{(1-s)\cdot x1+s\cdot x2\}+t\cdot\{(1-s)\cdot x4+s\cdot x3\cdot s\}$$

$$v=(1-t)\cdot\{(1-s)\cdot y1+s\cdot y2\}+t\cdot\{(1-s)\cdot y4+s\cdot y3\cdot s\}$$

where (x1, y1), (x2, y2), (x3, y3) and (x4, y4) are the coordinates of the vertices P1, P2, P3 and P4 of the quadrangle, respectively. As described above, in the first coordinate transformation system, the coordinates (u,v) are obtained by substituting the coordinates (s,t) in the above-described equations.

Similarly, in step S209, a second coordinate transformation system for transforming the quadrangle S into the rectangle R, i.e., transformation inverse to the above-described transformation, is generated. If the above-described equations are considered as simultaneous equations with respect to (s,t) and are solved for (s,t), transformation equations for obtaining the values (s,t) from the values (u,v) are obtained. The second coordinate transformation system is necessary because, although, as shown in FIGS. 3(a) and 3(b), the positions of vertices (control points) of the shape are assigned in the image, the positions of the points become uncertain when the quadrangle is transformed into the rectangle. That is, an assigned point corresponding to a vertex is provided as (u,v) in the quadrangle S. If a point corresponding to this assigned point in the rectangle R is not obtained, the correspondence between the original image and the transformed image cannot be obtained. Accordingly, a transformation system for obtaining a point (s,t) in the rectangle R corresponding to a point (u,v) in the quadrangle S is necessary.

Then, in step S210, by assuming that the rectangle R is an image having a certain resolution, a region for storing the image data of the rectangle R is secured within the storage device 103. A position P(s,t) of a certain pixel A in the rectangle R is transformed by the first coordinate transformation system, and the corresponding position P' (u,v) in the texture original image is calculated. The position P is not represented by the original values of the position of the pixel of the image of the rectangle R, but is represented by values (s,t) normalized in the vertical and horizontal directions. Then, in step S211, a pixel of the texture original image closest to the obtained position P' in the texture original image is found out, and the values of the pixel are stored in the storage device 103 as the image data of the pixel A. The processing of steps S210 and S211 is performed for all pixels of the image of the rectangle R (step S212). Thus, the image data of the rectangle R is obtained, and is stored in the storage device 103 as the image data 103b.

Then, positions in the rectangle R, i.e., positions in the image generated in steps S210–212, which correspond to the assigned points used for region assignment for the vertices or control points assigned in step S202 are calculated using the second coordinate transformation system (step S213). The obtained assigned points are also stored in the storage device 103 as the assigned-point-information data 103c. Finally, the image generated in steps up to step S212, and the positions of the assigned points in the image calculated in step S213 are output as the texture data. Thus, both of the image data for the texture, and information relating to the vertices or control points of the portion (a patch or the like) where the texture is to be mapped can be obtained.

Figure 6:
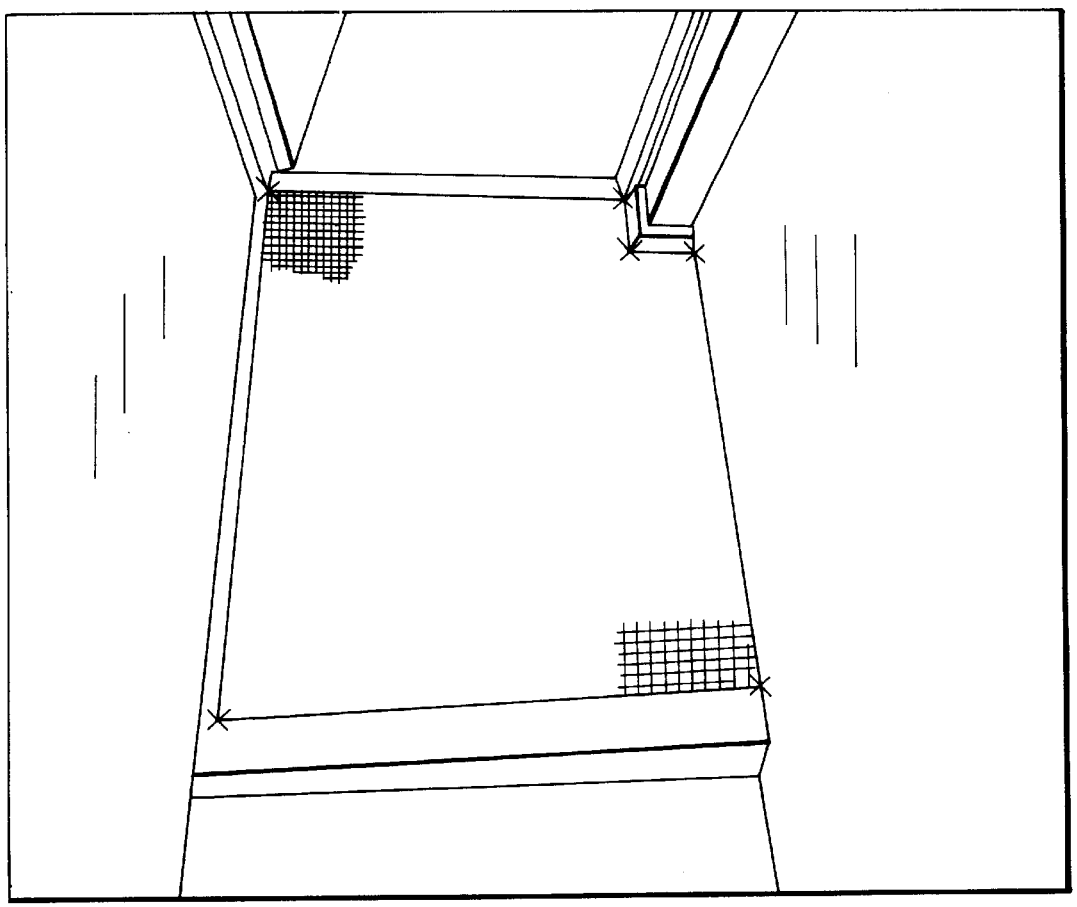
FIG. 6 is a diagram illustrating a texture original image and a state of performing region assignment.
Figure 7:
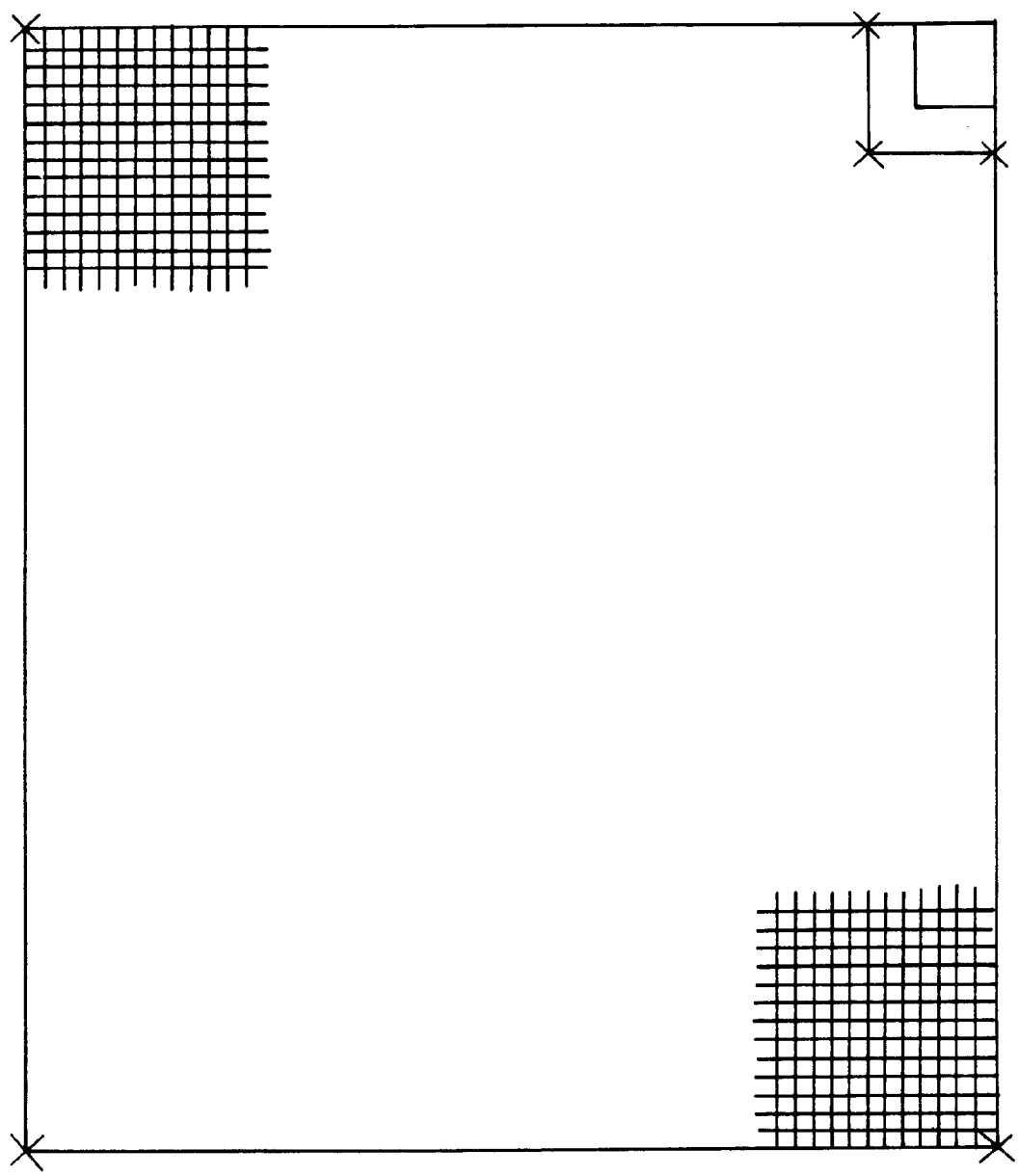
FIG. 7 is a diagram illustrating texture data obtained from the texture original image shown in FIG. 6.

FIGS. 6 and 7 illustrate an example of application of the first embodiment. FIG. 6 is a diagram illustrating a state in which the region required in step S202 is assigned for the texture original image read in step S201. Portions indicated by x correspond to the vertices of the patch. FIG. 7 illustrates the result of output when performing the processing of steps S203–S214 for the image shown in FIG. 6. Image data obtained by segmenting only the necessary region and the data of the assigned points are thus provided. FIGS. 6 and 7 represent color variable-density images.

FIG. 6 is obtained by photographing an entrance portion of a house. The entire floor enclosed by marks x has a meshy pattern. In FIG. 6, since the floor portion, serving as an object of texture data, is photographed obliquely from above, the pattern looks as stretching toward the upper portion. If such a texture image is segmented using a conventional rectangular region, high resolution is required in order to reproduce a fine pattern in an upper portion, thereby increasing the amount of texture data. If, on the other hand, resolution is restricted, the image is partially degraded.

On the other hand, in the first embodiment, the data is transformed in the form of a rectangle as shown in FIG. 7, and a substantially uniform pattern (close to the actual pattern) is reproduced and is used as texture data. Hence, it is unnecessary to have unnecessarily high resolution, and therefore it is possible to reduce the amount of texture data. Furtheremore, since the texture data is generated so as to include the necessary region as large as possible, it is possible to reduce useless data included in the texture data, and therefore to reduce the amount of the texture data. It is preferable to set the aspect ratio of the rectangle shown in FIG. 7 by being adjusted to the three-dimensional shape. For example, in order to restore the shrinked pattern in the upper portion of FIG. 6, it is preferable that the aspect ratio of the rectangle R shown in FIG. 7 coincides with the aspect ratio of the actual floor of the entrance.

As described above, according to the first embodiment, when photographing an object to be utilized as a texture, the degree of freedom in the size of the object and in the photographing direction increases, a photographing operation of a texture original image is simplified. Furthermore, since a useless region is effectively removed when extracting a necessary region from a texture original image, the amount of texture data can be reduced.

In addition, as shown in FIG. 6, even if an image of an object to be utilized as a texture becomes partially fine influenced by the photographing direction as shown in FIG. 6, texture data can be generated without unnecessarily increasing resolution and degrading the image.

The objects of the present invention achieved by the functions of the above-described apparatus and method can also be achieved by a storage medium storing the program of the first embodiment. That is, the storage medium is mounted in the apparatus, and the program read from the storage medium can achieve the new functions of the present invention. In this case, in the configuration of FIG. 1, the storage device 103 may, for example, comprise floppy disks, which can supply the program. The program supplied from the floppy disks is loaded in the RAM 102b and is executed by the CPU 101. FIGS. 8(a) and 8(b) illustrate the structural characteristics of the program of the first embodiment.

FIG. 8(a) is a diagram illustrating procedures of execution of controls by the program. In reading processing 80, an original image serving as the base for a texture is read via the input/output interface 104, and is stored in the storage device 103 (step S201 shown in FIG. 2). In assigning processing 81, a necessary region is assigned in a texture original image serving as the base for the texture using the vertices or control points of a patch to which the texture is to be mapped (step S202). In generation step 82, rectangles enclosing the region assigned in the assigning processing 81 are generated based on a predetermined rule, and a quadrangle having a minimum area is extracted from among the generated quadrangles (steps S203–S207).

In first transformation processing 83, the image enclosed by the quadrangle extracted in the generation processing 82 is transformed into a rectangular image having a desired size (steps S208–S212). In second transformation processing 84, the region (comprising characteristics points) assigned in the assigning processing 81 is transformed into a region in the rectangular image (step S213). In output processing 85, the rectangular image obtained in the first transformation processing 83 and information indicating the assigned region obtained in the second transformation processing 84 are output as texture data (step S214).

FIG. 8(b) illustrates a memory map indicating a state of storage of program modules for executing the above-described respective sets of prcessing in the storage medium. A reading-processing module 80', an assigning-processing module 81', a generation-processing module 82', a first-transformation-processing module 83', a second-transformation-processing module 84' and an output-processing module 85' are program modules for executing the reading processing 80, the assigning processing 81, the generation processing 82, the first transformation processing 83, the second transformation processing 84 and the output processing 85, respectively.

As described above, according to the first embodiment, a photographing operation when preparing a texture original image is simplified, and it is possible to remove a useless operation when extracting a necessary region from the texture original image (i.e., to delete unnecessary regions).

Second Embodiment

Figure 9:
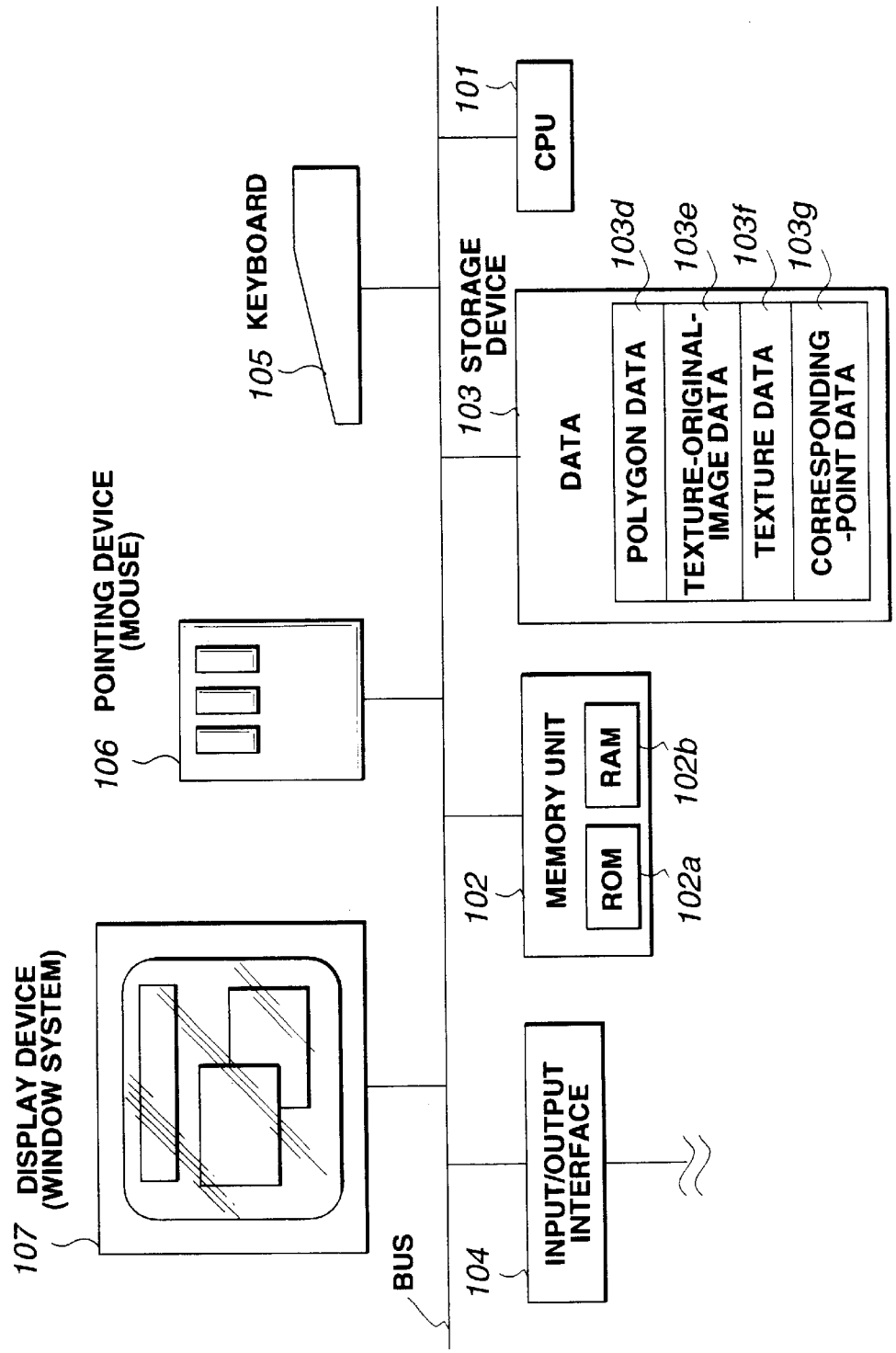
FIG. 9 is a schematic block diagram illustrating the configuration of an information processing apparatus according to a second embodiment of the present invention.

FIG. 9 is a schematic block diagram illustrating the configuration of an information processing apparatus according to a second embodiment of the present invention. The configuration of the apparatus shown in FIG. 9 is the same as the configuration shown in FIG. 1, except that the storage device 103 stores data, such as polygon data 103d, texture-original-image data 103e, texture data 103f and the like.

Figure 10:
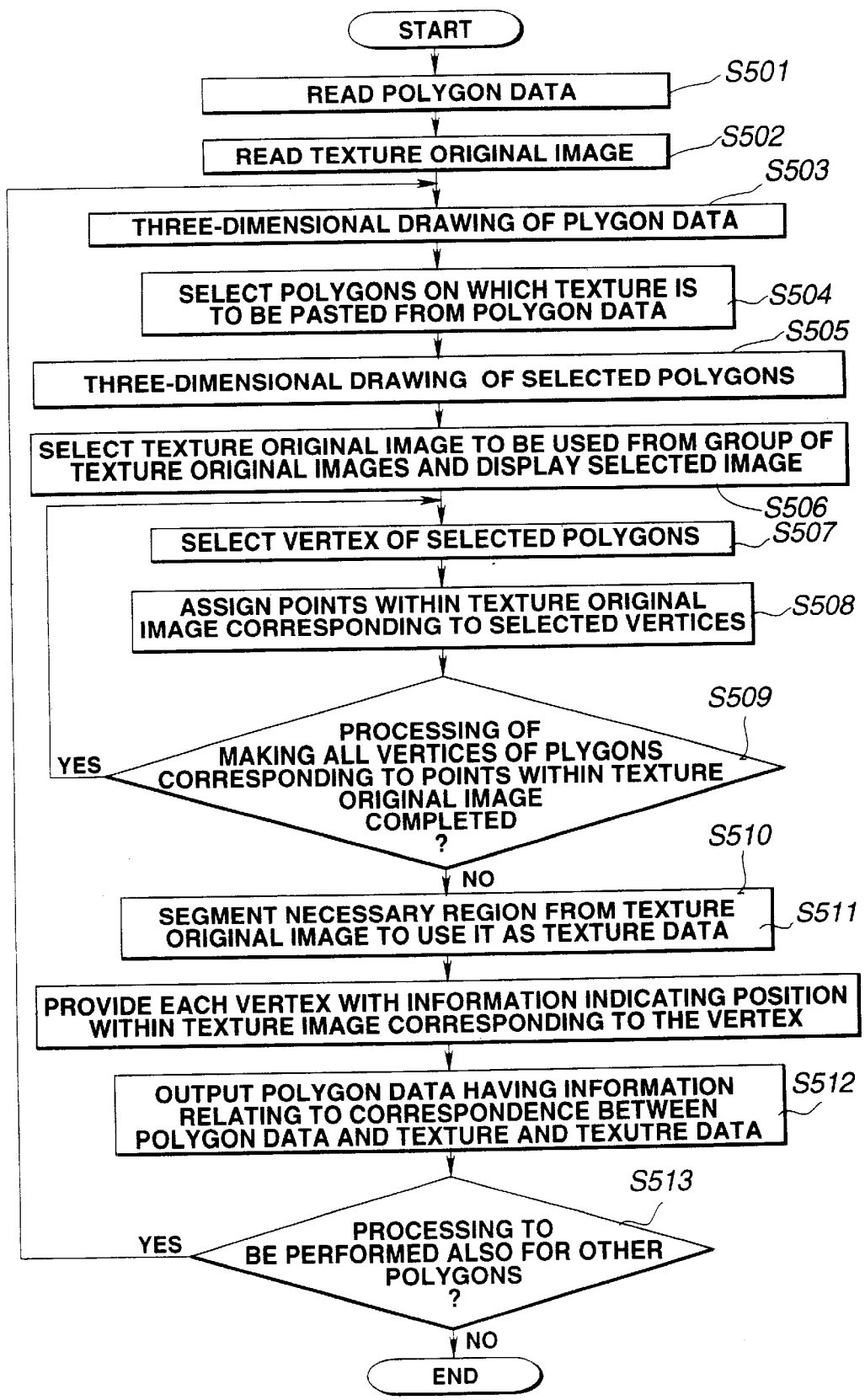
FIG. 10 is a flowchart illustrating procedures of processing when pasting a texture image onto a polygon.

Next, a description will be provided of processing of mapping a texture image onto a polygon in the information processing apparatus of the second embodiment having the above-described configuration. FIG. 10 is a flowchart illustrating procedures of processing when mapping the texture image onto the polygon.

In step S501, polygon data representing a three-dimensional shape is read via the input/output interface 104, and is stored in the storage device 103 (the polygon data 103d shown in FIG. 9). The polygon data can be formed using an existent three-dimensional CAD (computer aided design) tool or the like, and represents a three-dimensional object, a scene or the like in the form of surface patches. The polygon data comprises at least one polygon.

The polygon data has been formed in advance using a CAD system or the like, and has been stored in the storage medium, comprising floppy disks or the like. If the medium comprises floppy disks, the polygon data can be read using a floppy-disk drive connected to the input/output interface 104. In the information processing apparatus of the second embodiment, the polygon data may be formed by executing application, such as CAD or the like. In this case, the formed polygon data is directly stored in the storage device 103.

Then, in step S502, a texture original image is read. The texture original image is an image serving as the base of a texture to be mapped as the pattern of the surface of the polygon, and comprises an ordinary color image or black-and-white image. In this step, an input operation is performed via the input/output interface 104 as in step S501, and the input data (the texture-original-image data 103e shown in FIG. 9) is stored in the storage device 103. In this case, the input/output interface 104 is connected to a scanner for reading an image. The texture original image read in this step is an image serving as the base for the texture to be mapped onto the polygon data read in step S501. The texture-original-image data stored in the storage device 103 may represent data for one image or a plurality of images.

Then, in step S503, the three-dimensional drawing of the polygon data is performed. In this step, first, one window is generated in the window system 107, and the polygon data stored in the memory unit 102 is drawn on the window as a three-dimensional scene. In a simple method for drawing polygon data as a three-dimensional scene, for example, projective transformation of the three-dimensional positions of the polygon data onto a two-dimensional plane is performed, and the image on the projected plane is displayed on the window. The polygon data may also be drawn according to any other method.

Figure 11:
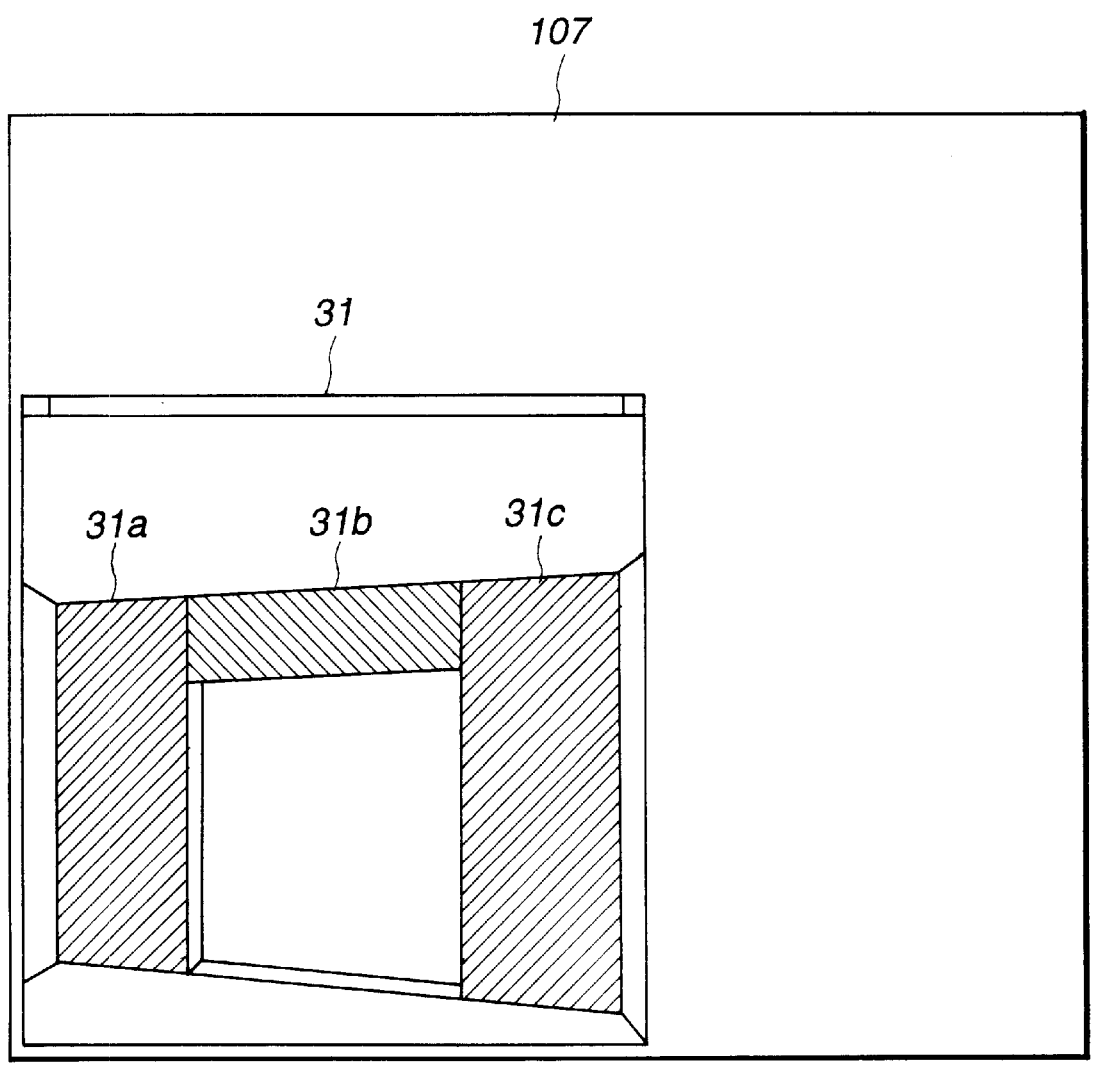
FIG. 11 is a diagram illustrating a state of a display picture surface in a window system of the second embodiment.

Then, in step S504, at least one polygon to which the texture is to be mapped is assigned from the polygon data drawn in step S503 using the mouse 106. FIG. 11 illustrates the result of such an operation, i.e., the state of the display picture surface in the window system of the second embodiment. In FIG. 11, a window 31 is displayed on the display device 107. Within the window 31, three polygons are interactively selected from the window where the polygon data is three-dimensionally drawn. The selected polygons are represented by changing the color (represented by hatching in FIG. 11). A polygon can be assigned by moving a mouse cursor within the region of the desired polygon and then clicking a mouse button.

Figure 12:
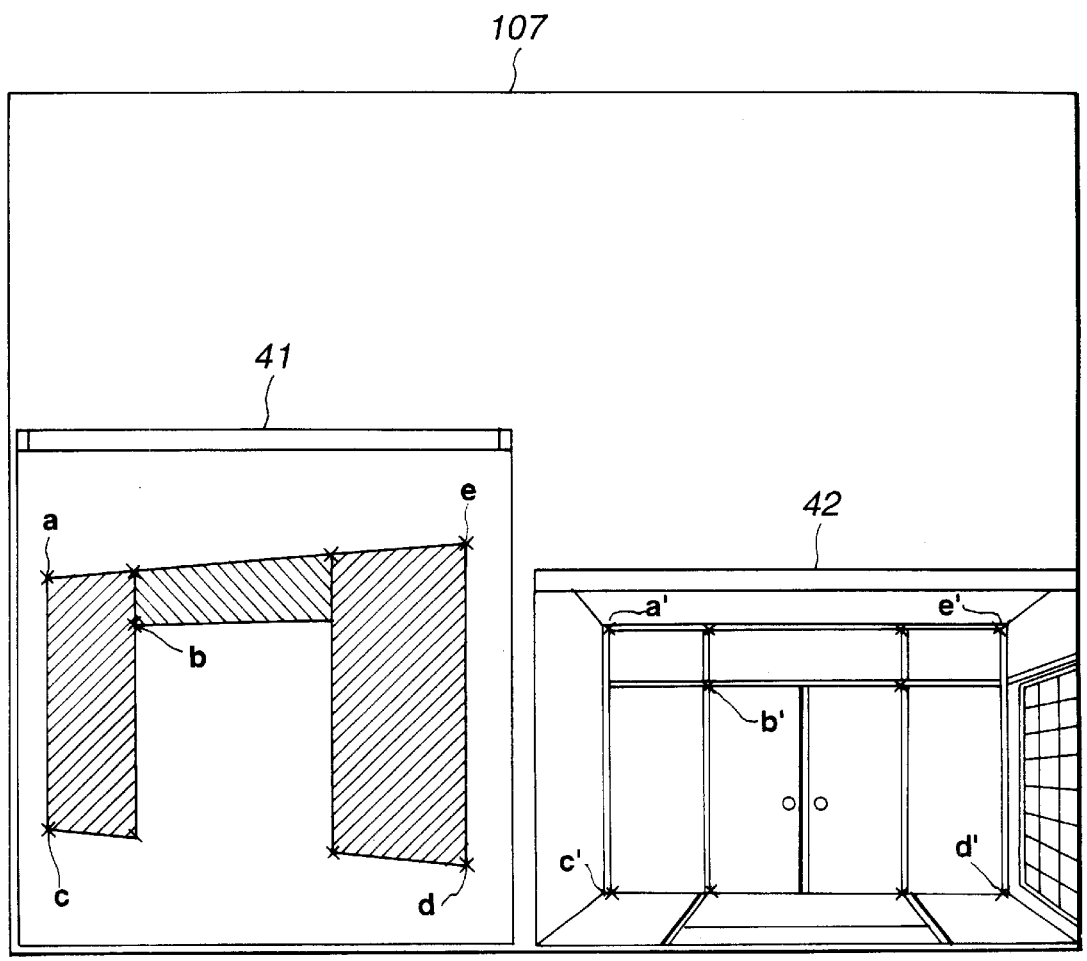
FIG. 12 is a diagram illustrating a state of assigning vertices of a polygon and corresponding points on a texture original image.

Then, in step S505, the polygons selected in step S504 are extracted and are subjected to three-dimensional drawing (see a window 41 shown in FIG. 12). The method of three-dimensional drawing is the same as in step S503. The three-dimensionally drawn image generated in this step is used for assigning vertices of the polygon in step S507.

Then, in step S506, the texture original image corresponding to the polygons selected in step S504 is selected from the group of texture original images stored in the storage device 103, and the selected image is displayed on the display device 107 by newly generating a window (see a window 42 shown in FIG. 12). This is a step in which the operator selects a pattern to be mapped onto the polygons. In the window 42, a Japanese-style room is displayed as the texture original image. The texture original image displayed on the window 42 is a color image.

Then, in step S507, one vertex of the polygons drawn on the window 41 shown in FIG. 12 is assigned using the mouse 106. In step S508, a point in the texture original image corresponding to this vertex (hereinafter termed a "corresponding point") is assigned using the mouse 106. The processing of steps S507 and S508 is performed for all vertices of the selected polygons (step S509). The relationship between the vertices and the corresponding points assigned in the above-described processing is stored in the storage device 103 as the corresponding-point data 103g.

FIG. 12 illustrates a state in which the vertices of the polygons and the corresponding points in the texture original image are assigned. In FIG. 12, the extracted texture image and the texture original image (a photographic image of the Japanese-style room) are displayed on the windows 41 and 42, respectively, and the vertices of the polygons and the result of assigning the corresponding points in the texture original image are shown (the vertex and the corresponding points are indicated by x). As a result, corresponding-point data is configured such as, a corresponding point a' of the texture original image in the window 42 for a vertex a' of the polygon image in the window 41, a corresponding point b' for a vertex b, and the like.

The correspondence of vertices of the polygon is not always provided for the entire image surface of the texture original image. Hence, in step S510, the image of a necessary region is segmented from the texture original image while removing unnecessary regions, and is stored in the storage device 103 as texture data (the texture data 103f shown in FIG. 9). In a simple method for segmenting an image, a rectangle including a range indicated by points corresponding to the vertices of the polygon in the texture original image is segmented from the texture original image. In the example of display on the window 42 shown in FIG. 12, a rectangle including a quadrangle comprising points a', c', d' and e' is segmented. It is desirable that the segmented rectangle has a minimum area, because the size of texture data can be minimized.

Then, in step S511, position information of corresponding points in the segmented texture image (texture data) is provided for the respective vertices of the polygon. Since corresponding points for the respective vertices are stored as corresponding-point data 103g, the corresponding points may be obtained by referring to the stored data. The position information indicates positions by the coordinate values of the points in the texture image, values (between 0 and 1.) when the abscissa and the ordinate of the texture image are normalized, and the like. The polygon data having the information of the corresponding points in the texture image provided for the respective vertices is over-written as the polygon data 103d. This data may, of course, be stored in another file separate from the polygon data 103d as polygon data having corresponding-point information.

Then, in step S512, the texture image, and the polygon data having correspondence to the texture image are output via the input/output interface 104 as the result of the processing.

When performing the processing of the above-described steps S503–S512 for other polygons after asking the user if the processing is to be performed for the other polygons, the process returns to step S503 (step S513). On the other hand, if there is an instruction to terminate the processing, the processing is terminated at step S513.

According to the above-described procedures, it is possible to interactively make polygon data representing only a three-dimensional shape correspond to an image, and to generate computer graphics data representing a surface pattern.

The above-described step S512 for outputting polygon data and texture data may be placed after step S513.

For the processing of segmenting texture data from the texture original image in step S510, instead of the method of segmenting a rectangle enclosing a range of points in the texture original image having correspondence to the vertices, any other method, such as a method of generating rectangular texture data according to linear or nonlinear transformation, or the like, may be adopted. The method and apparatus in the first embodiment is also applicable to steps S510, S511 and S512.

In another approach, steps S504 and S505 are omitted, and the polygon data formed in step S503 may be utlized in step S507 without being modified. In this approach, polygons are not explicitly selected in advance, but a texture is mapped onto a polygon including vertices selected for providing correspondence to the texture. Accordingly, in step S509, it is not determined if assignment of vertices for all assigned polygons has been completed. Instead, it is determined if there is any vertex which has not yet been assigned in the polygon having selected vertices.

Although in the second embodiment, a mouse is used as the pointing device 106, the pointing device 106 is not limited to a mouse. For example, it is, of course, possible to use a tablet or the like.

In the second embodiment, a window system capable of displaying a plurality of windows is used as the display device 107. However, a window system capable of using one picture surface only as one window may also be used by providing divided display regions within one picture surface (window).

In the second embodiment, polygon data having corresponding points of the texture image provided for the respective vertices, and the texture image are output via the input/output interface 104. That is, these data can be stored in a storage device, such as floppy disks or the like, or can be depicted by providing an external apparatus with the data. However, since these data are also stored in the storage device 103, the information processing apparatus may, of course, perform drawing processing using the stored data and display the resultant image on the display device 107.

As described above, according to the second embodiment, it is possible to assign positions corresponding to respective vertices of polygon data within the texture original image, and to paste a texture image with a simple operation even if polygon data to which the texture image is to be mapped has a complicated shape.

Figure 14A:
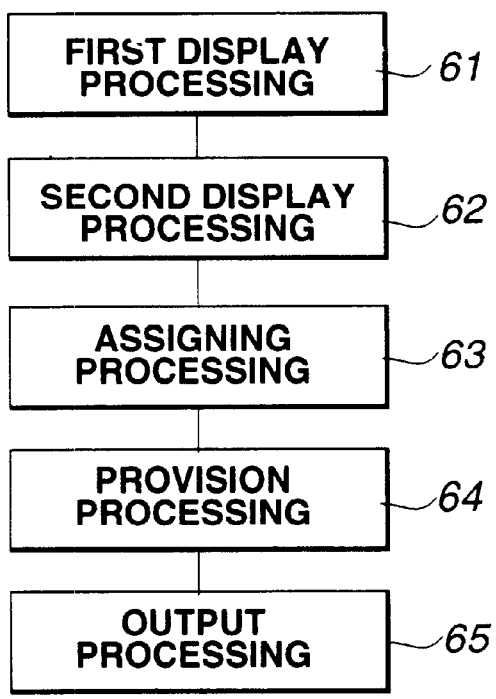
FIGS. 14(a) and 14(b) are diagrams illustrating the configuration of storage medium storing a control program for realizing the control of the second embodiment.
Figure 14B:
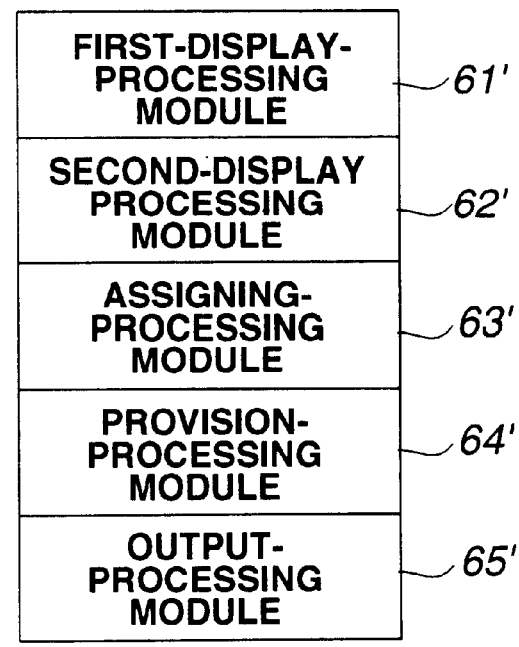

The objects of the present invention achieved by the functions of the above-described apparatus or method may also be achieved by a storage medium storing the program of the second embodiment. That is, the storage medium is mounted in the apparatus, and the program read from the storage medium can achieve the new functions of the present invention. In this case, if floppy disks are used as the storage medium, the control program stored in the floppy disks is read by a floppy-disk drive connected to the input/output interface 104 and is loaded in the RAM 102b of the memory unit 102, and is executed by the CPU 101. FIGS. 14(a) and 14(b) illustrate the structural characteristics of the program of the second embodiment.

FIG. 14(a) is a diagram illustrating procedures of control according to respective processing modules of the program. In first display processing 61, a polygon image comprising at least one polygon is displayed as the window 31. This processing coincides with the above-described step S503. In second display processing 62, a texture original image including a texture image to be used is displayed as the window 42. This processing coincides with the above-described step S505.

In assigning step 63, points in the polygon image displayed in the first display processing 61 and points in the texture original image displayed in the second display processing 62 which correspond to the points in the polygon image are assigned. In this processing, assignment of the vertices of the polygon on the window 31 and the corresponding points in the texture image on the window 42 is performed. However, as in the above-described approach of the second embodiment, the assignment of the vertices and the corresponding points may be performed after extracting the polygon to which the texture image is to be mapped and displaying the window 41 (steps S505, and S507–S509).

In provision processing 64, position information of the corresponding points in the texture original image is provided for the respective points assigned in the polygon image in the assigning processing (step S511). At that time, as in the above-described approach of the second embodiment, an operation of segmenting a rectangular region where the corresponding points are present from the texture original image to provide a texture image is convenient, because the size of the texture image can be reduced (step S510).

In output processing 65, the polygon data having the position information of the corresponding points in the texture original image provided for the points of the polygon in the provision processing 64, and the texture image are output as data for drawing (step S512).

FIG. 14(b) illustrates a state of storage of the control program in the storage device. Respective control modules 61'–65' include program codes for executing the above-described sets of processing 61–65.

As described above, according to the second embodiment, it is possible to automatically make the positions of points assigned in a polygon image correspond to the positions of points assigned in a texture original image including a necessary texture image. Hence, an operation of mapping the texture image onto a polygon is simplified.

According to the second embodiment, it is possible to interactively generate computer graphics data having a texture from an image appropriately including a polygon region without providing a texture image adjusted to a polygon in advance.

The present invention may be applied to a system comprising a plurality of apparatuses or to an apparatus comprising a single unit. The present invention may, of course, be applied to a case in which the objects of the invention are achieved by providing a system or an appartus with programs. In this case, a storage medium storing the programs constitutes the present invention. By reading the programs from the storage medium into the system or the apparatus, the system or the apparatus operates in a predetermined manner.

The individual components shown in outline or designated by blocks in the drawings are all well known in the information processing method and apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A texture-data generation apparatus for generating texture data to be used for computer graphics, said apparatus comprising:

assigning means for assigning a region in a texture original image serving as a base for a texture;

generation means for generating quadrangles, each enclosing the region assigned by said assigning means, based on a predetermined rule;

extraction means for extracting a quadrangle having a minimum area from among the quadrangles generated by said generation means;

first transformation means for transforming an image enclosed by the quadrangle extracted by said extraction means into a rectangular image having a desired size;

second transformation means for transforming the region assigned by said assigning means into a region in the rectangular image; and output means for outputting the rectangular image transformed by said first transformation means and information indicating the region transformed by said second transformation means as texture data.

2. A texture-data generation apparatus according to claim 1, wherein said assigning means assigns the region by assigning a plurality of characteristic points, representing a shape of an image, onto which the texture is to be pasted in the texture image, and said second transformation means transforms the plurality of characteristic points assigned by said assigning means into characteristic points at corresponding positions in the rectangular image.

3. A texture-data generation apparatus according to claim 2, wherein said generation means generates quadrangles formed by straight lines and including four edges of a convex-hull polygon enclosing the plurality of characteristic points.

4. A texture-data generation apparatus according to claim 1, wherein said first transformation means comprises calculation means for calculating positions of points in the rectangular image corresponding to points in the image enclosed by the quadrangle.

5. A texture-data generation method for generating texture data to be used for computer graphics, said method comprising the steps of:

assigning a region in a texture original image serving as a base for a texture;

generating quadrangles, each enclosing the region assigned in said assigning step, based on a predetermined rule;

extracting a quadrangle having a minimum area from among the quadrangles generated in said generating step;

transforming an image enclosed by the quadrangle extracted in said extracting step into a rectangular image having a desired size;

transforming the region assigned in said assigning step into a region in the rectangular image; and outputting the rectangular image transformed in said first transforming step and information indicating the region transformed in said second transforming step as texture data.

6. A texture-data generation method according to claim 5, wherein said assigning step assigns the region by assigning a plurality of characteristic points, representing a shape of an image, onto which the texture is to be mapped in the texture image, and said second transforming step transforms the plurality of characteristic points assigned in said assigning step into characteristic points at corresponding positions in the rectangular image.

7. A texture-data generation method according to claim 6, wherein said generating step generates quadrangles formed by straight lines and including four edges of a convex-hull polygon enclosing the plurality of characteristic points.

8. A texture-data generation method according to claim 5, wherein said first transforming step comprises the step of calculating positions of points in the rectangular image corresponding to points in the image enclosed by the quadrangle.

9. A storage medium for storing a program for controlling a computer, said program comprising:

a procedure code of an assigning step of assigning a region in a texture original image serving as a base for a texture;

a procedure code of a generating step of generating quadrangles, each enclosing the region assigned in the assigning step, based on a predetermined rule;

a procedure code of an extracting step of extracting a quadrangle having a minimum area from among the quadrangles generated in the generating step;

a procedure code of a first transforming step of transforming an image enclosed by the quadrangle extracted in the extracting step into a rectangular image having a desired size;

a procedure code of a second transforming step of transforming the region assigned in the assigning step into a region in the rectangular image; and a procedure code of an outputting step of outputting the rectangular image transformed in the first transforming step and information indicating the region transformed in the second transforming step as texture data.

10. An information processing apparatus comprising:

first display means for displaying a polygon image;

second display means for displaying a texture image;

assigning means for defining a voluntary area on the polygon image by manually assigning vertex points on the polygon image displayed by said first display means and for defining a texture area, to be mapped on the voluntary area of the polygon image, on the texture image by manually assigning corresponding points corresponding to the vertex points of the voluntary area in the texture image displayed by said second display means, wherein the corresponding points assigned in the texture image define one of a plurality of manually-selectable shapes;

provision means for respectively providing the vertex points assigned in the polygon image by said assigning means with position information of the corresponding points in the texture image; and output means for outputting polygon data, having the position information of the corresponding points in the texture image provided by said provision means for the vertex points on the polygon image, and the texture image as data for image drawing.

11. An information processing apparatus according to claim 10, wherein the vertex points on the polygon image assigned by said assigning means are vertices of the polygon image onto which the texture image is to be pasted.

12. An information processing apparatus according to claim 10, wherein said assigning means comprises:

first assigning means for assigning at least one polygon onto which the texture image is to be mapped;

third display means for extracting the polygon image assigned by said first assigning means and displaying the polygon image; and second assigning means for assigning the vertex points of the polygon image displayed by said third display means to corresponding points in the texture image.

13. An information processing apparatus according to claim 10, further comprising segmenting means for segmenting a region including the vertex points assigned by said assigning means as the texture image from the texture original image displayed by said second display means, wherein said provision means respectively provides the vertex points in the polygon image assigned by said assigning means with position information of corresponding points in the texture image segmented by said segmenting means.

14. An information processing method comprising the steps of:

displaying a polygon image;

displaying a texture image;

defining a voluntary area on the polygon image by manually assigning vertex points on the polygon image displayed in said first displaying step and defining a texture area, to be mapped on the voluntary area of the polygon image, on the texture image by manually assigning corresponding points corresponding to the vertex points of the voluntary area in the texture image displayed in said second displaying step, wherein the corresponding points assigned in the texture image define one of a plurality of manually-selectable shapes;

respectively providing the vertex points assigned in the polygon image in said assigning step with position information of the corresponding points in the texture image; and outputting polygon data, having the position information of the corresponding points in the texture image provided in said providing step for the vertex points on the at least one polygon of the polygon image, and the texture image as data for image drawing.

15. An information processing method according to claim 14, wherein the vertex points on the polygon image assigned in said assigning step are vertices of the polygon image onto which the texture image is to be pasted.

16. An information processing method according to claim 14, wherein said assigning step comprises the steps of:

assigning one or more polygons onto which the texture image is to be mapped;

extracting the one or more polygons assigned in said assigning step and displaying the extracted one or more polygons as a polygon image; and assigning the vertex points of the one or more extracted and displayed polygons to corresponding points in the texture image.

17. An information processing method according to claim 14, further comprising the step of segmenting a region including the vertex points assigned in said assigning step as the texture image from the texture original image displayed in said second display step, wherein said providing step respectively provides the vertex points in the polygon image assigned in said assigning step with position information of corresponding points in the texture image segmented in said segmenting step.

18. A storage medium for storing a program for controlling, when executed, an information processing method of a computer, said program comprising:

procedure code for a first displaying step of displaying a polygon image;

procedure code for a second displaying step of displaying a texture image;

procedure code for an assigning step of defining a voluntary area on the polygon image by manually assigning vertex points on the polygon image displayed in the first displaying step and defining a texture area, to be mapped on the voluntary area of the polygon image, on the texture image by manually assigning corresponding points corresponding to the vertex points of the voluntary area in the texture image displayed in the second displaying step, wherein the corresponding points assigned in the texture area define one of a plurality of manually-selectable shapes;

procedure code for a providing step of respectively providing the vertex points assigned in the polygon image in the assigning step with position information of the corresponding points in the texture image; and procedure code for an outputting step of outputting polygon data, having the position information of the corresponding points in the texture image provided in the providing step for the vertex points on the polygon image, and the texture image as data for image drawing.

19. A storage medium according to claim 18, further comprising a procedure code of a segmenting step of segmenting a region including the vertex points assigned in the assigning step as the texture image from the texture image displayed in the second display step, wherein the providing step respectively provides the vertex points in the polygon image assigned in the assigning step with position information of corresponding points in the texture image segmented in the segmenting step.

* * * * *